United States Patent [19]
Tsunemi et al.

[11] Patent Number: 5,058,383
[45] Date of Patent: Oct. 22, 1991

[54] HYDRAULIC MOTOR CONTROL CIRCUIT

[75] Inventors: Masahiro Tsunemi, Miki; Yuji Kondo, Akashi; Kenichi Shimoura, Kobe, all of Japan

[73] Assignee: Nippon Air Brake Kabushiki Kaisha, Kobe, Japan

[21] Appl. No.: 622,474

[22] Filed: Dec. 5, 1990

[30] Foreign Application Priority Data

Dec. 14, 1989 [JP] Japan ................. 1-325378
Dec. 14, 1989 [JP] Japan ................. 1-325379

[51] Int. Cl.⁵ ............................................. F16D 39/00
[52] U.S. Cl. ........................................ 60/493; 60/465; 60/466; 91/443
[58] Field of Search ............. 60/460, 465, 466, 493; 280/840; 180/41; 91/443, 461

[56] References Cited

U.S. PATENT DOCUMENTS

| | | | |
|---|---|---|---|
| B 433,094 | 1/1976 | Hunck et al. | 60/465 X |
| 3,125,324 | 3/1964 | Vivier | 60/466 X |
| 3,333,415 | 8/1967 | Adams | 60/466 X |
| 4,137,492 | 1/1979 | Schultz | 280/840 X |
| 4,712,377 | 12/1987 | Yoshida et al. | 60/493 X |
| 4,948,166 | 8/1990 | Kaneko | 180/41 X |
| 4,975,849 | 12/1990 | Ema | 280/840 X |

FOREIGN PATENT DOCUMENTS

| | | | |
|---|---|---|---|
| 2430138 | 1/1975 | Fed. Rep. of Germany | 180/41 |
| 51-37380 | 3/1976 | Japan | |
| 0024210 | 2/1980 | Japan | 60/460 |

*Primary Examiner*—Edward K. Look
*Assistant Examiner*—Todd Mattingly
*Attorney, Agent, or Firm*—Morris Fidelman; Franklin D. Wolffe

[57] ABSTRACT

A hydraulic motor control circuit for use in a device for driving construction equipment, such as shovel loader, which comprises a hydraulic driving motor, a pump for feeding compressed oil to the hydraulic motor and a tank for receiving the compressed oil discharged from the hydraulic motor. The circuit comprises a pilot operation type main valve for controlling the oil flow between the pump and the motor and between the motor and the tank, and a remote control valve for feeding a pilot oil pressure to a pilot chamber of the main valve to turn the main valve to a first position for driving the hydraulic motor. As a feature of this invention, the control circuit further comprises an apparatus for detecting the slanting angle of a downward slope and feeding an oil pressure corresponding to the slanting angle to a second pilot chamber of the main valve. The main valve is adapted to turn from its first position to its second position in which the speed of rotation of the hydraulic motor is confined in accordance with the slanting angle.

2 Claims, 6 Drawing Sheets

HYDRAULIC MOTOR CONTROL CIRCUIT

BACKGROUND OF THE INVENTION

This invention relates to a control circuit for a hydraulic motor used in a travelling device for a hydraulic shovel loader or the like.

Figure 1:
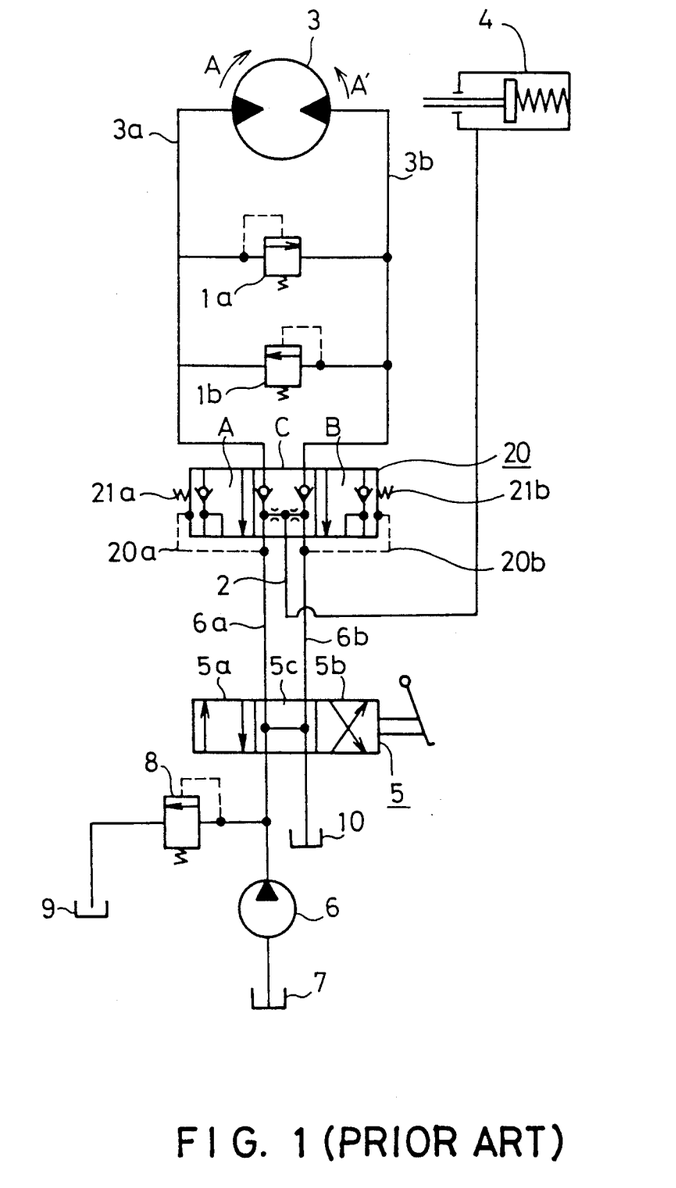
FIG. 1 is a schematic diagram showing a hydraulic motor control circuit according to the prior art.

A typical example of this kind of control circuit is disclosed in Japanese patent opening gazette No. S51-37880. As shown in FIG. 1, this circuit includes a direction turnover valve 5 and a counterbalance valve 20 inserted between a hydraulic pump 6 and a hydraulic motor 3. The hydraulic motor 3 is used as a drive source for a travelling device of a hydraulic shovel loader or the like.

When the direction turnover valve 5 is turned from its neutral position 5c to its turnover position 5a in the abovementioned prior art control circuit for the hydraulic motor 3, high pressure oil from the hydraulic pump 6 acts through a main circuit 6a to the counterbalance valve 20 to turn it into its turnover position A. Accordingly, the high pressure oil from the hydraulic pump 6 flows through main circuits 6a and 3a into the hydraulic motor 3. Exhaust oil from the hydraulic motor 3 flows through main circuit 3b, counter balance valve 20 and direction turnover valve 5 into a tank 10. Accordingly, the hydraulic motor 3 rotates to arrowed direction A to drive the travelling device. If the direction turnover valve 5 is turned from the neutral position 5c to the turnover position 5b, the counterbalance valve 20 is turned to its turnover position B and the high pressure oil from the hydraulic pump 6 is fed to the hydraulic motor in the opposite direction. Accordingly, the direction of rotation is inverted as shown by arrow A'.

A hydraulic cylinder 4 which is used for braking is connected through the direction turnover valve 5 to the tank 10 to actuate a brake, when the counter balance valve 20 is in its neutral position C. The brake is a spring brake and serves as a parking brake. As described above, if the direction turnover valve 5 is turned to its turnover position 5a or 5b, either of the main circuits 6a and 6b is connected to the hydraulic cylinder 4 to release the brake. In other words, if the direction turnover valve 5 is turned from its neutral position 5c to either turnover position 5a or 5b, the brake 4 is released, the hydraulic motor 3 is fed with high pressure oil and the travelling device is driven. When the direction turnover valve 5 returns to its neutral position C, the high pressure oil in the hydraulic cylinder 4 is exhausted to the tank 10 to actuate the brake. In other words, this parking brake can prevent accidental self-movement of the shovel loader at a stop.

Braking valve 1a and 1b disposed between the main circular 3a and 3b are used for smoothly stopping the hydraulic motor 3 when the motor 3 is stopped from its driven state. More particularly, when the counterbalance valve 20 returns to its neutral position from either turnover position thereof and the hydraulic motor 3 is subjected to an inertial load in its driving direction, it acts as a pump. The braking valve 1a or 1b controls hydraulic pressure in the exhaust side to brake the hydraulic motor 3 to stop it smoothly. For example, if the inertial load acts in the arrow direction A, the hydraulic pressure in the main circuit 3b is controlled to produce a braking force.

The abovementioned hydraulic motor control circuit serves to control the speed of rotation of the hydraulic motor 3 at a fixed value when a construction equipment comes down a slope. This control is effected by reducing the flow between the main circuits 3b and 6b in the middle of turnover of the counterbalance valve 20 from the turnover position to the neutral position. In other words, the counterbalance valve 20 is adapted to stop when the hydraulic pressure acting in a pilot circuit 20a or 20b branching from the main circuit 6a or 6b balances with an urging force of a spring 21a or 21b, and the abovementioned reduction of flow between the main circuit 3a and 6a or 3b and 6b is determined at a value which can balance with this urging force. More specifically, when the construction equipment comes in a slope while the hydraulic motor 3 rotates in the arrow direction A and the slope conforms with this direction of rotation, the hydraulic motor 3 initiates self-running. Then, the hydraulic pressure in the main circuits 3a and 6a reduces and the hydraulic pressure in the pilot circuit 20a reduces also. The counterbalance valve 20 is urged by the spring 21b and begins to return from the turnover position to the neutral position to reduce the flow between the main circuits 3b and 6b in the exhaust side of the hydraulic motor 3. The reduction of flow in the exhaust side of the hydraulic motor 3 results in increase of the hydraulic pressure in the side of main circuit 6a, which moves the counterbalance valve 20 toward the turnover position A.

As described above, the abovementioned counterbalance valve 20 in the prior art hydraulic control circuit uses the hydraulic pressure of the main circuit in the feed side as a pilot pressure to reduce the flow in the exhaust side of the main circuit in accordance with a relationship between the pilot pressure and the spring force of the counterbalance valve. In other words, utilizing the linear relationship between the urging force and deflection of the spring, the difference in the spring force is coverted into displacement and the reduction of flow is provided in response to the displacement. According to such principle of operation of the counterbalance valve, the flow in the exhaust side is reduced when the hydraulic pressure of the main circuit lowers in the feed side. As the result of reduction is fed back to the pilot pressure, hunting may occur if the function of counterbalance valve is sharpened, and it is necessary to reduce the speed of response for preventing the hunting. Accordingly, in the travelling hydraulic pressure circuit of a construction equipment, it is a general practice to reduce the speed of response to prevent hunting. Therefore, the response of the counterbalance valve may delay when the construction equipment begins to come down a slope. Such delay of response of the counterbalance valve may cause cavitation to occur in the hydraulic motor 3 so that, if the cavitation becomes large, the hydraulic motor 3 or the construction equipment begins self-running.

On the other hand, in the prior art hydraulic motor control circuit, the direction turnover valve 5 and the counterbalance valve 20 are connected in series to the hydraulic pressure circuit. However, the counterbalance valve 20 is used only for preventing the hydraulic motor 3 from self-running in a slope as described above, and it is unnecessary in normal travelling. With this counterbalance valve 20 included in the hydraulic motor control circuit, large pressure loss and low efficiency of the hydraulic circuit can occur. For example, the pressure loss attributable to the counterbalance valve 20 is as large as 10 kgf/cm$^2$ when the circuit pressure is 300 kgf/cm² and it corresponds to 3.3 percent of the circuit pressure.

SUMMARY OF THE INVENTION

Accordingly, an object of this invention is to provide an improved hydraulic motor control circuit for reducing the flow in the exhaust side of the hydraulic motor in accordance with the angle of slope to prevent self-running of the hydraulic motor.

Another object of this invention is to provide such an improved hydraulic motor control circuit without inducing the circuit pressure loss.

The first object of this invention can be attained in accordance with a first embodiment of this invention which provides a hydraulic motor control circuit comprising a main valve of pilot operaton type, which is operated by pilot oil pressure of a remote control valve, disposed between a pump and a hydraulic motor for driving a travelling device of a construction equipment. A slanting angle detector which operates in accordance with the angle of downward slope of a road surface being traveled is connected to the exhaust side of the remote control valve, thereby introducing the output of the slanting angle detector to a pilot chamber opposite to a pilot chamber of the main valve which is subjected to the exhaust force of the remote control valve when the slanting angle detector converts the exhaust pressure of the remote control valve into a pressure corresponding to the angle of downward slope of the road surface and delivers it from its output. The main valve of pilot operation type is adapted to turn from its turnover position to its control position when the pilot pressure acts to both of the abovementioned pilot chambers and, in the control position, the aperture from the pump to the hydraulic motor is made less than the aperture from the hydraulic motor to a tank.

The second object of this invention can be attained in accordance with a second embodiment of this invention which provides a hydraulic motor control circuit compising a main valve of pilot operation type, which is operated by pilot oil pressure of a remote control valve, disposed between a pump and a hydraulic motor for driving a travelling device of a construction equipment. A pressure reducing valve which is operated by hydraulic motor driving pressure is connected to the exhaust side of the remote control valve, thereby introducing the output pressure of the pressure reducing valve into a pilot chamber opposite to a pilot chamber of the main valve which is subjected to exhaust force of the remote control valve when the pressure reducing valve is operated by the hydraulic motor driving pressure to convert it into a pressure corresponding to the angle of slope. The main valve of pilot operation type is adapted to turn from its turnover position to its control position and, in the control position, the aperture from the pump to the hydraulic motor is made less than the aperture from the hydraulic motor to a tank.

These and other objects and features of this invention will be described in more detail below with reference to the accompanying drawings.

BRIEF DESCRIPTION OF THE DRAWINGS

In the drawings.

Throughout the drawings, same reference symbols are given to like structural components.

DESCRIPTION OF THE PREFERRED EMBODIMENTS

Figure 2:
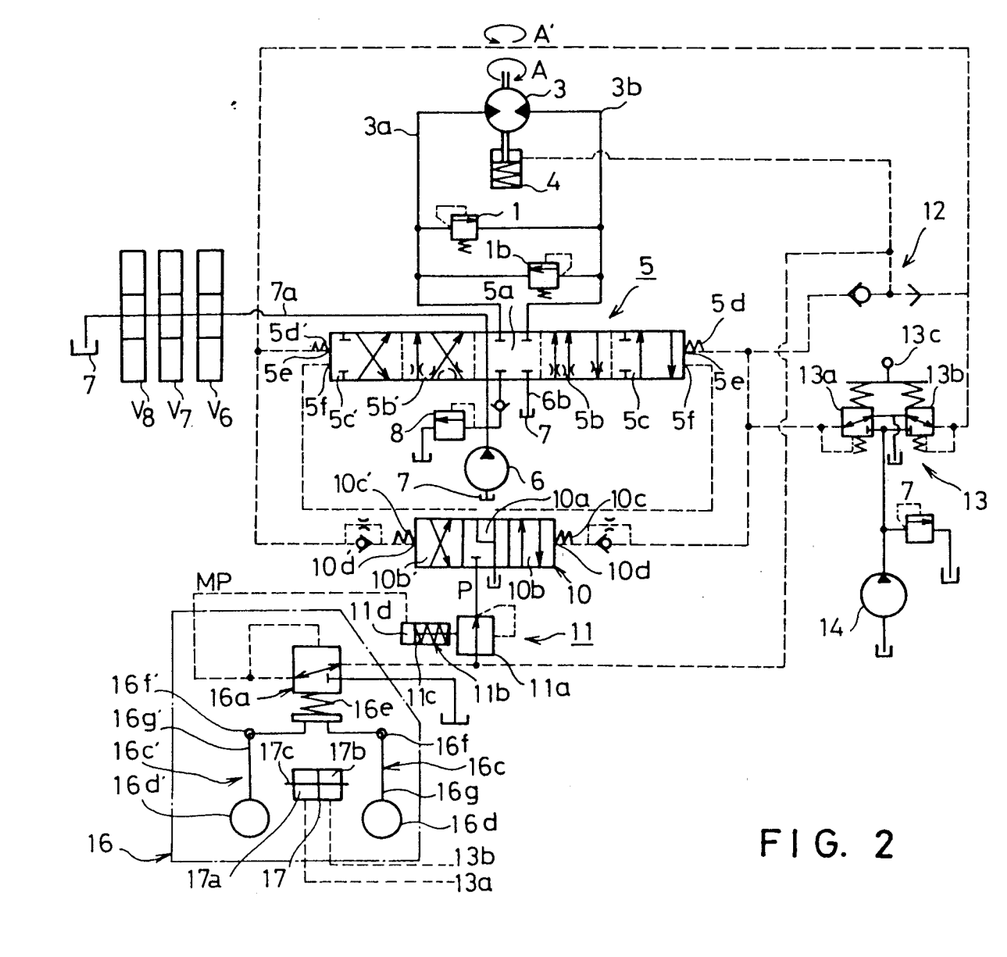
FIG. 2 is a schematic diagram showing a first embodiment of the hydraulic motor control circuit according to this invention.

Referring to FIG. 2, a hydraulic motor 3 for driving a crawler of a construction equipment is connected through main circuits 3a and 3b and a main valve 5 of pilot operation type to an output port of a pump 6 and to a tank 7. The main valve 5 of pilot operation type is designed to have a neutral position 5a, two control positions 5b and 5b' and two turnover positions 5c and 5c' and also include two pairs of pilot chambers 5e and 5e40 and 5f and 5f' and a pair of springs 5d and 5d'. The main valve 5 turns from its neutral position 5a to its turnover position 5c or 5c' through its control position 5b or 5b' against the spring 5d or 5d' when a pilot pressure acts to the pilot chamber 5e or 5e'. In the neutral position 5a at which no pilot pressure is given from a remote control valve 13, it closes the main circuits 3a and 3b of the hydraulic motor 3 and connects the output port of the pump 6 through and unload circuit 7a to other turnover valves V6, V7 and V8. When the pilot pressure of the remote control valve 13 acts to the pilot chamber 5e, due to the difference between the pilot pressure and the urging force of the spring 5d', it turns from its neutral position 5a through its control position 5b to its turnover position 5c. Thus, the output pressure of the pump 6 passes from the main circuit 3a into the hydraulic motor 3. The output port of the hydraulic motor 3 is then connected through the main circuits 3b and 6b to the tank 7. Accordingly, the motor 3 rotates in the arrow direction A. In contrast, when the pilot pressure of the remote control valve 13 acts to the pilot chamber 5e', due to the difference between the pilot pressure and the urging force of the spring 5d, it turns from its neutral position 5a through its control position 5b' to its turnover position 5c'. Therefore, the oil flow is inverted and the hydraulic motor 3 rotates in the opposite direction A'.

Figure 3:
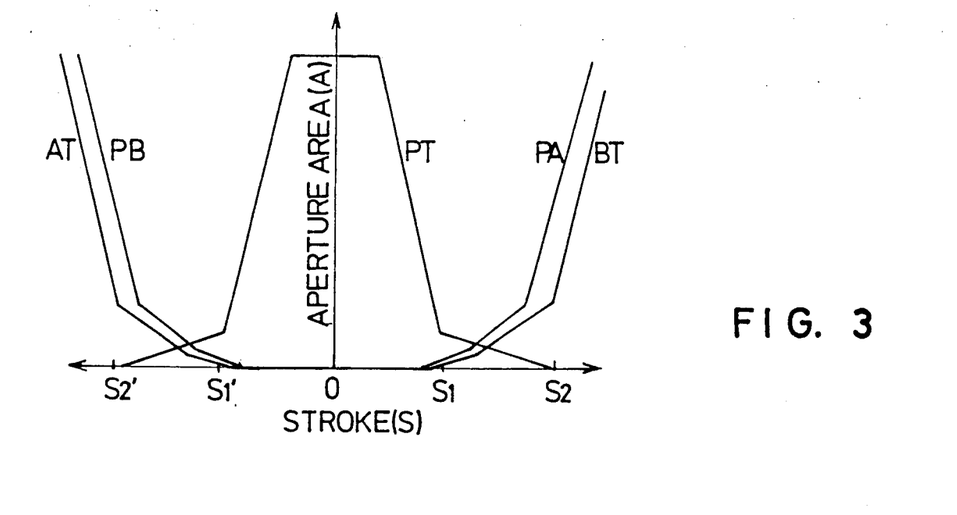
FIG. 3 is a diagram showing a relationship between the aperture area and stroke of a main spool of pilot operation type main valve used in the first embodiment.

The main valve 5 of pilot operation type shows a relationship between the aperture area and stroke of its main spool as shown in FIG. 3 in the range from its neutral position 5a to its turnover positions 5c and 5c'. In FIG. 3, a curve PT shows such a relationship between the aperture area A between the output port at the unload circuit 7a and the stroke S, in that the aperture A is reduced with the stroke S in accordance with the curve PT. A curve PA shows a relationship between the aperture A between the pump 6 and the main circuit 3a or 3b in the feed side of the hydraulic motor 3 and the stroke S. Accordingly, when the main valve 5 of pilot operation type moves its spool from its neutral position 5a toward its turnover position 5c or 5c', the flow between the pump 6 and the tank 7 is reduced as shown by the curve PT and the flow between the pump and the main circuit in the feed side of the hydraulic motor 3 is increased as shown by the curve PA. The flow between the main circuit in the exhaust side of the hydraulic motor 3 and the tank 7 is increased as shown by a curve BT. As shown, the curve BT corresponds to less aperture area than the curve PA at the same stroke S of the main spool. The apertures in both curves PA and BT begin to open when the stroke S becomes S1 (or S1') and the aperture areas A become greatest at the maximum stroke S2 (or S2'). This range of stroke from S1 to S2 (or S1' to S2') corresponds to the control position 5b or 5b'. Accordingly, when the main valve 5 of pilot operation type is in the control position 5b or 5b', the hydraulic motor 3 is in a back pressure state in which the flow is reduced more in its exhaust side than its feed side. The range of spool stroke between S1 and S2 or S1' and S2' will be referred hereinunder as "control zone".

The remote control valve 13 for applying the pilot pressure to the pilot chamber 5e or 5e' of the main valve 5 of pilot operation type is composed of a pressure reducing valve 13a responsive to a command of a lever 13c to apply the oil pressure of a pilot pressure source 14 to the pilot chamber 5e and a pressure reducing valve 31b responsive to the command of the lever 13c to apply the oil pressure of the pilot pressure source 14 to the pilot chamber 5e'.

The output port of the pressure reducing valve 13a composing the remote control valve 13 is connected to a pilot section 10d of a turnover valve 10 of pilot operation type which is disposed between a pressure reducing valve 11 of pilot operation type and the pilot chambers 5f and 5f' of the main valve 5 of pilot operation type; and the output pilot of the pressure reducing valve 13b is connected to a pilot section 10d' of the turnover valve 10 of pilot operation type. The turnover valve 10 of pilot operation type has a neutral position 10a for connecting the pilot chambers 5f and 5f' to the tank 7, a turnover position 10b for connecting the pilot chamber 5f' to the pressure reducing valve 11 of pilot operation type and connecting the pilot chamber 5f to the tank 7 and a turnover position 10b' for connecting the pilot chamber 5f to the pressure reducing valve 11 of pilot operation type and connecting the pilot chamber 5f' to the tank 7 and includes a pair of springs 10c and 10c'.

A shuttle valve 12 is disposed between the output ports of the pressure reducing valves 13a and 13b of the remote control valve 13; and the exhaust port of the shuttle valve 12 is connected to a braking cylinder 4. Accordingly, when the remote control valve 13 is actuated, its pilot pressure is applied to the braking cylinder 4 to release brake of the hydraulic motor 3. The timings of release of the braking cylinder 4 and operation of the hydraulic motor 3 overlap slightly.

Moreover, the exhaust port of the shuttle valve 12 for selecting the high pressure side of the exhaust remote control pressure of the remote control valve 13 is connected to the pressure reducing valve 11 of pilot operation type and a slanting angle detector 16 for providing the pressure reducing valve 11 with a pressure reducing command.

Figure 4:
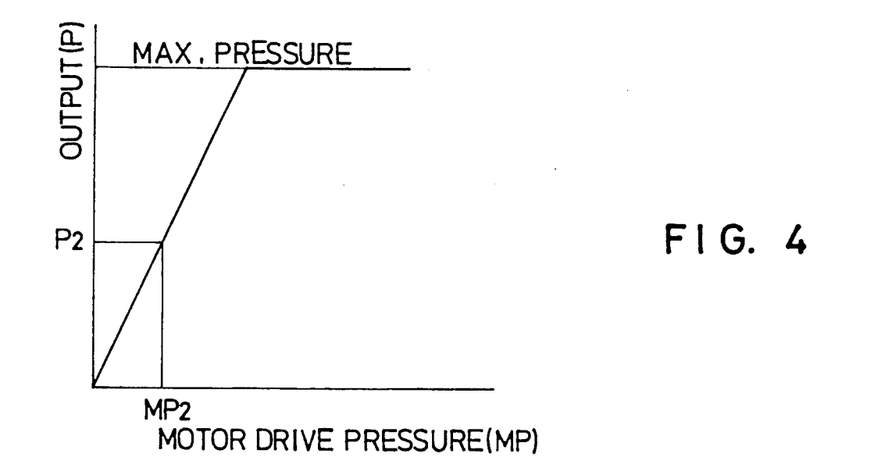
FIG. 4 is a characteristic diagram of a pressure reducing valve of pilot operation type used in the first embodiment.

The presence reducing valve 11 of pilot operation type which is connected to the turnover valve 10 of pilot operation type is composed of a pressure reducing valve 11a connected to the output port of the remote control valve 13 and a pilot section 11b for applying a pressure reducing command to the pressure reducing valve 11a. The pilot section 11b includes a spring chamber connected to the tank 7 and provided with a spring 11c and a pressure chamber 11d connected to the output port of the slanting angle detector 16 and, when the output pressure of the slanting angle detector 16 acts to the pressure chamber 11d, the pressure reducing command is applied to the pressure reducing valve 11 of pilot operation type against the spring 11c. The response to the command pressure MP of the slanting angle detector 16, the pressure reducing valve 11 raises its output pressure P as shown in FIG. 4. Accordingly, the pressure reducing valve 11 of pilot operation type produces no oil pressure from its output when no pressure occurs at the output of the slanting angle detector 16.

The slanting angle detector 16 includes a pressure reducing valve 16a and angle detecting units 16c and 16c' for applying a force corresponding to the slanting angle of a slope to a spring 16e of the pressure reducing valve 16a. The angle detecting unit 16c includes a lever 16g supported by a pivot 16f, put in contact with the spring 16e of the pressure reducing valve 16a at one end thereof and located by a weight 16d at the other end. Similarly, the angle detecting unit 16c' also includes a lever 16g' supported by a pivot 16f', put in contact with the spring 16e at one end thereof and loaded by a weight 16d' at the other end. In order to inhibit the detector from operating when the construction equipment is going up a slope, and operation locking cylinder 17 is disposed between the angle detecting units 16c and 16c'. The operation locking cylinder 17 includes pressure chambers 17a and 17b connected respectively to the pressure reducing valves 13a and 13b of the remote control valve 13, and an output rod 17c connected to a piston. When the pressure reducing valve 13a of the remote control valve 13 is operated, an oil pressure is applied to the pressure chamber 17a to actuate the output rod 17c rightward to prevent the angle detecting unit 16c from swaying leftward. Similarly, when the pressure reducing valve 13b of the remote control valve 13 is operated, the oil pressure is applied to the pressure chamber 17b to actuate the output rod leftward to prevent the angle detecting unit 16c from swaying rightward.

Figure 5:
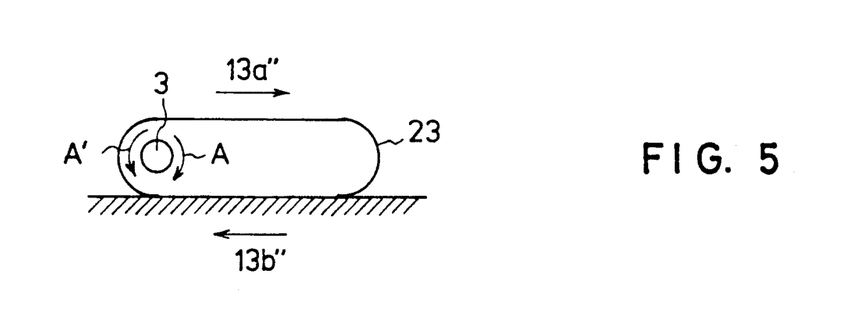
FIG. 5 is a schematic diagram showing a crawler of a construction equipment which is now driven.

Now, the description will be made specifically below with reference to FIG. 5. When the lever 13c of the remote control valve 13 is moved leftward to actuate the pressure reducing valve 13a, the hydraulic motor 3 rotates in the arrow direction A to drive a crawler 23 rightward in an arrow direction 13a''. If the crawler 23 begins to go up a slope in the driving direction, the angle detecting unit 16c tends to sway leftward. However, it cannot sway leftward since the output rod 17c of the operation locking cylinder 17 actuates toward the angle detecting unit 16c. When it comes down a slope, however, the angle detecting unit 16c' sways rightward to actuate the pressure reducing valve 16a of the slanting angle detector 16. In contrast, when the lever 13c of the remote control valve 13 is moved rightward to actuate the pressure reducing valve 13b, the hydraulic motor 3 rotates in the arrow direction A' and the crawler 23 is driven leftward in the opposite arrow direction 13b''. If it begins to go up a slope, in this driving direction, the angle detecting unit 16c' tends to sway rightward. However, it cannot sway rightward since the output rod 17c of the operation locking cylinder 17 actuates toward the angle detecting unit 16c'. When it begins to come down a slope, however, the angle detecting unit 16c sways rightward to actuate the pressure reducing valve 16a of the slanting angle detector 16. Thus, in the slanting angle detector 16, the angle detecting unit 16c or 16c' is actuated, when the construction equipment begins to come down a slope, to apply a force corresponding to the angle of slope to the spring 16e of the pressure reducing valve 16a. The pressure reducing valve 16a responds to the force of this spring 16e to produce an oil pressure at its output.

Now, the description will be made on the operation of the abovementioned hydraulic motor control circuit.

(1) On the operation in level land travelling

In FIG. 2, if the lever 13c of the remote control valve 13 is moved leftward, the pressure reducing valve 13a produces at its output a pilot pressure in accordance with an amount of actuation of the lever 13c to the pressure reducing valve 13a.

This pilot pressure is applied to the pilot chamber 5e of the main valve 5 of pilot operation type, the pilot chamber 10d of the turnover valve 10 of pilot operation type and the pressure chamber 17a of the operation locking cylinder 17, and also to the braking cylinder 4 for releasing the brake of the hydraulic motor 3 through the shuttle valve 12.

The brake of the hydraulic motor 3 is released by the pilot pressure applied to the brake releasing braking cylinder 4 and the main valve 5 of pilot operation type is turned from the neutral position 5a to the turnover position 5c by the pilot pressure applied to the pilot chamber 5e. Then, the high pressure oil exhausted from the pump 6 flows through the main circuit 6a and 3a into the hydraulic motor 3 and the high pressure oil from the hydraulic motor is discharged through the main circuit 3b to the tank 7. Accordingly, the hydraulic motor 3 begins to rotate in the arrow direction A and the crawler 23 travels rightward as shown by an arrow 13a'' in FIG. 5.

At this time, the turnover valve 10 of pilot operation type has been turned to the turnover position 10b to connect the output of the pressure reducing valve 11 of pilot operation type to the pilot chamber 5f' of the main valve 5 of pilot operation type. Moreover, the output rod 17c of the operation locking cylinder 17 has been shifted rightward by the pilot pressure applied to the pressure chamber 17a thereof.

In the case of level land travelling, the angle detector 16c of the slanting angle detector 16 is in a stop at the position as shown in FIG. 2 and, therefore, the pressure reducing valve 16a does not operate. Accordingly, in the pressure reducing valve 11 of pilot operation type, its pressure reducing valve 11a is also arranged not to operate with the urging force of the spring 11c. Since the traveling speed of the construction equipment is slow (about 4 to 6 kilometers per hour), the main valve 5 of pilot operation type is always put in the turnover position 5c or 5c' for full-speed travelling and never in the control position 5b or 5b' in level land travelling. This is because the travelling speed is so low that it need not be controlled.

(2) On the operation in upward slope travelling

When the crawler 23 begins to go up a slope during the abovementioned rightward travel, the lever 16g of the slanting angle detector 16 tends to sway leftward as an effect of the weight 16d. However, the output rod 17c of the operation locking cylinder 17 having shifted rightward obstructs the leftward sway of the lever 16g. While the lever 16g' of the slanting angle detector 16 sways also leftward as an effect of the weight 16d', the head end of the lever 16g' comes apart from the spring 16e of the pressure reducing valve 16a and, therefore, no oil pressure grows at the output of the pressure reducing valve 16a. Accordingly, the main valve 5 of pilot operation type is in its turnover position 5c and the construction equipment travels at a full speed as in the abovementioned case of level land travelling.

(3) On the operation in downward slope travelling

When the crawler 23 begins to come down a slope during the abovementioned rightward travel, the levers 16g and 16g' of the slanting angle detector 16 are swayed by the weights 16d and 16d', respectively, since the output rod 17c of the operation locking cylinder 17 having shifted rightward does not obstruct the sway. The head end of the swayed lever 16g' pushes the spring 16e of the pressure reducing valve 16a and the pressure reducing valve 16a exhausts an oil pressure corresponding to the pushing force from its output. This oil pressure from the slanting angle detector 16 is applied to the pressure chamber 11d of the pressure reducing valve 11 to produce a pilot pressure at its output, which is then applied to the pilot chamber 5f' of the main valve 5 of pilot operation type. The pilot pressure applied to the pilot chamber 5f' acts against the pressure applied to the pilot chamber 5e to turn the main valve 5 of pilot operation type from its turnover position 5c to its control position 5b. In the control position 5b, the flow between the output of the hydraulic motor 3 and the tank 7 is reduced in accordance with the spool position of the main valve 5 as shown in FIG. 3, thereby enabling prevention of self-running of the construction equipment. When the slanting angle of the slope becomes large, the output of the slanting angle detector 16 increases to cause the main valve to return from the control position 5b to the neutral position 5a, thereby further reducing the flow between the output of the hydraulic motor 3 and the tank 7 to prevent self-running of the construction equipment.

While the above description has been made on the case where the lever 13c of the remote control valve 13 is moved leftward, the operation is similar to the above when the lever 13c is moved rightward, except that the travelling direction of the construction equipment is inverted, and no further description will be made thereon.

The pressure reducing valve 11 of pilot operation type is needed when the gain of the pilot pressure is changed or when the slanting angle detector 16 is constructed electrically. Otherwise, however, the output of the slanting angle detector 16 in the embodiment of FIG. 2 may be connected directly to the input of the turnover valve 10 of pilot operation type.

Now, the description will be made about a variation of the first embodiment with reference to FIG. 6.

The main difference of this variation from the embodiment of FIG. 2 is that the slanting angle detector 16 including the weights 16d and 16d' is substituted with a slanting angle detector 24 including float 24e. In order to prevent movement of the spool of the main valve 5 in response to the command of the slanting angle detector 24 on an upward slope, turnover valves 25 and 26 of pilot operation type are disposed between the slanting angle detector 24 and the main valve 5. The description will be made only about those components differing from those of FIG. 2 and no description will be made about those components having the same reference symbols as those of FIG. 2.

The slanting angle detector 24 includes a pair of pressure reducing valves 24a and 24b having springs 24c and 24d, respectively, and a float 24e having an action member 24h for applying a force corresponding to the slanting angle of a slope to the springs 24c and 24d. The float 24e is floating in liquid substance contained in a vessel 24f. Although the vessel 24f and the pressure reducing valves 24a and 24b slant together in response to the slanting angle of the slope, the liquid surface 24g remains horizontal. Accordingly, the action member 24h of the float 24e compresses the spring 24c or 24d in response to the slanting angle of the slope and the pressure reducing valves 24a and 24b produce pilot pressures corresponding to the slanting angle.

Figure 7A:
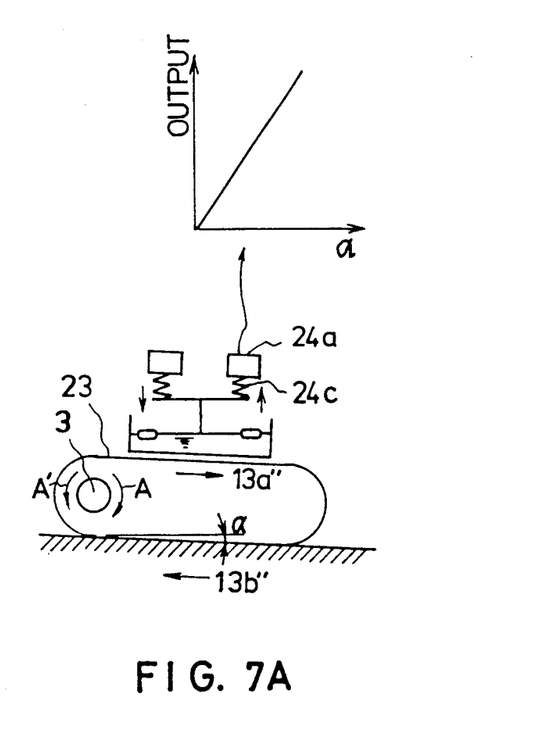
FIGS. 7A and 7B are schematic diagrams of a crawler given for an aid of explaining operation of the hydraulic motor control circuit of this invention.

The description will be made more specifically with reference to FIGS. 7A and 7B. In FIG. 7A, when the lever 13c of the remote control valve 13 is moved leftward to actuate the pressure reducing valve 13a, the hydraulic motor 3 rotates in the arrow direction A and the crawler 23 travels rightward in the arrow direction 13a". If the crawler 23 begins to come down a slope in this travelling direction, the spring 24c is compressed to actuate the pressure reducing valve 24a. The output pressure of the pressure reducing valve 24a is proportional to the slanting angle α. In contrast, when the lever 13c of the remote control valve 13 is moved rightward to actuate the pressure reducing valve 13b, the hydraulic motor 3 rotates in the arrow direction A' and the crawler 23 travels leftward in the arrow direction 13b". If the crawler 23 begins to go up a slope, the spring 24c is compressed to actuate the pressure reducing valve 24a as same as in the abovementioned downward slope.

Figure 7B:
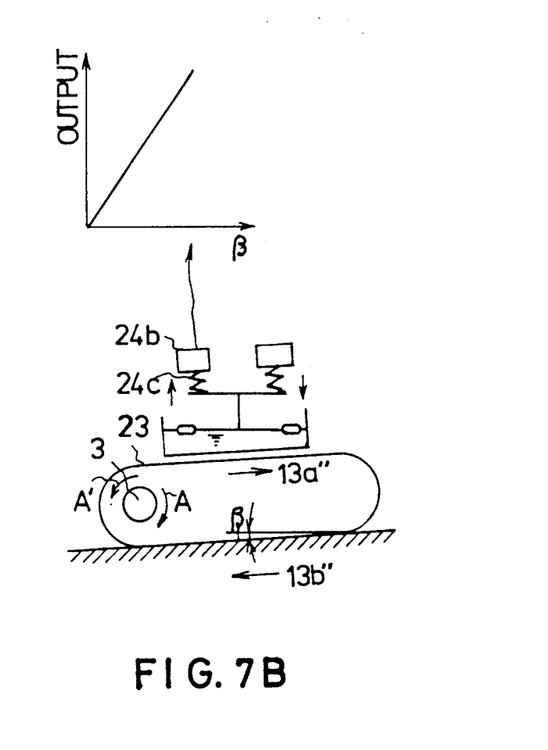

A similar effect occurs also in the pressure reducing valve 24b when the slanting angle is inverted as shown by β in FIG. 7B. Accordingly, tunnover valves 25 and 26 of pilot operation type are inserted between the slanting angle detector 24 and the main valve 5. More specifically, the turnover valve 25 is inserted between the pilot chamber 5f and the pressure reducing valve 24a and the turnover valve 26 is inserted between the pilot chamber 5f' and the pressure reducing valve 24b. The turnover valves 25 and 26 have closed positions 25a and 26a and open positions 25b and 26b, respectively. The turn over valves 25 and 26 include springs 25c and 26c and pilot chambers 25d and 26d, respectively, and the output pressure of the pump 6 acting to the pilot chambers 25d and 26d generally overcomes the springs 25c and 26c to put the turnover valves 25 and 26 in their closed positions 25a and 26a. However, when the crawler 23 comes down a slope to reduce the output of the pump 6, the springs 25c and 26c overcome the pilot pressure to turn the turnover valves into their open positions 25b and 26b. Consequently, it is arranged that the output pressures of the pressure reducing valves 24a and 24b are applied to the pilot chambers 5f and 5f' of the main valve 5 only in the case of downward slope as shown in FIGS. 7A and 7B.

Now, the description will be made about the operation of the abovementioned hydraulic motor control circuit.

(1) On the operation in level land travelling

Figure 6:
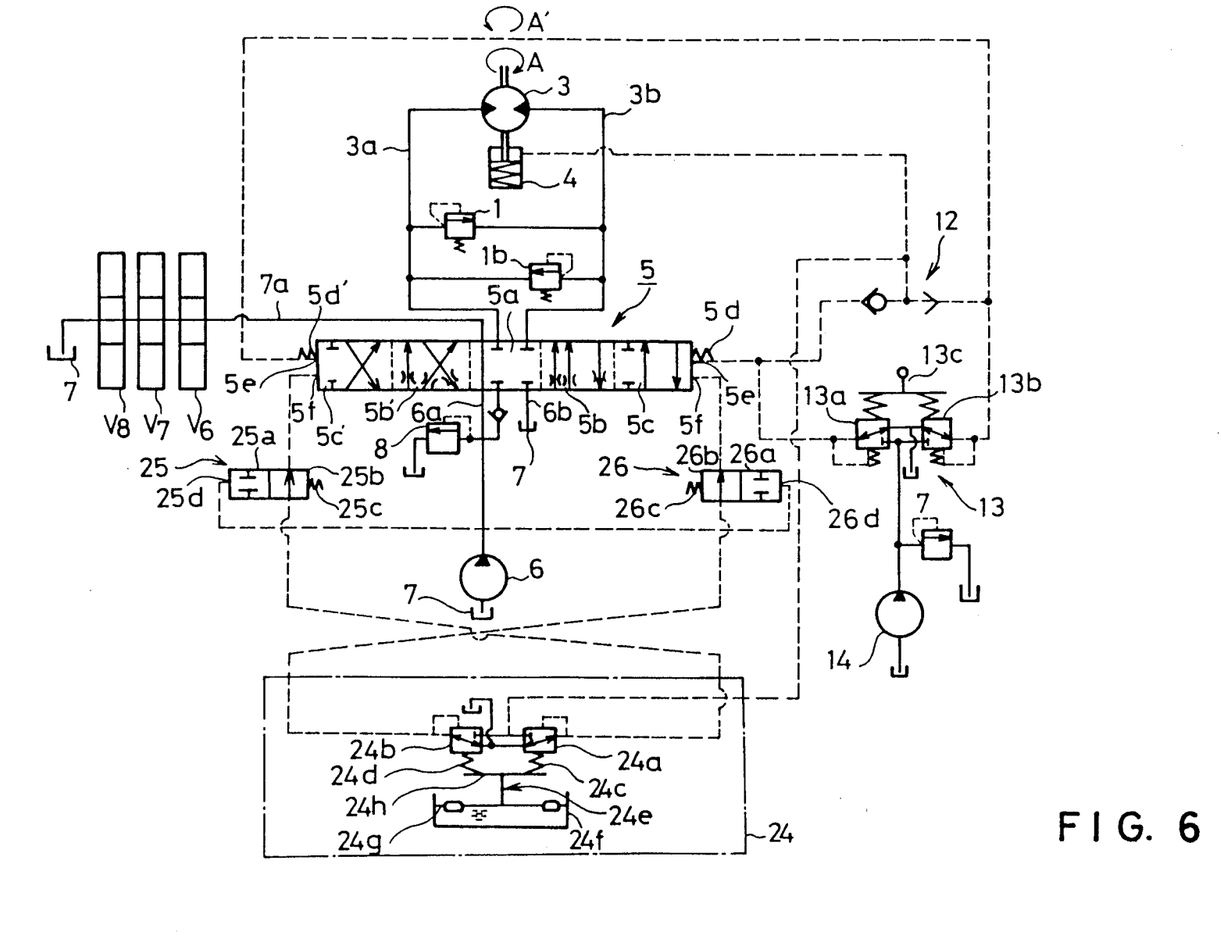
FIG. 6 is a schematic diagram showing a modification of the first embodiment according to this invention.

In FIG. 6, the lever 13c of the remote control valve 13 is moved leftward, the pressure reducing valve 13a produces a pilot pressure from its output in accordance with the amount of movement of the lever 13c. This pressure is applied to the pilot chamber 5e of the main valve 5 of pilot operation type and also to the braking cylinder 4 for releasing brake of the hydraulic motor 3 through the shuttle valve 12.

The brake of the hydraulic motor 3 is released by the pilot pressure applied to the braking cylinder 4 and the main valve 5 is turned from its neutral position 5a to its turnover position 5c by the pilot pressure applied to the pilot chamber 5e. Then, the compressed oil exhausted from the pump 6 flows through the main circuits 6a and 3a into the hydraulic motor 3 and the oil from the hydraulic motor 3 is discharged through the main circuit 3b to the tank 7. Therefore, the hydraulic motor 3 begins to rotate in the arrow direction A and the crawler 23 travels rightward as shown by the arrow 13a" in FIG. 5.

At this time, a normal output pressure is applied to the pilot chambers 25d and 26d of the turnover valves 25 and 26 and the turnover valves 25 and 26 are in their closed positions 25a and 26a. In the level land travelling, the float 24e of the slanting angle detector 24 is horizontal and the pressure reducing valves 24a and 24b do not operate. Since the travelling speed of the construction equipment is generally slow (4 to 6 kilometers per hour), the main valve 5 is always turned to its turnover position 5c or 5c' for full speed operation in the case of level land travelling and never goes to its control position 5b or 5b'. This is because the speed is so low that it need not be controlled.

(2) On the operation in upward slope travelling

When the crawler 23 begins to go up a slope during the abovementioned rightward travel, as shown by the arrow 13a" in FIG. 7B, the pressure reducing valve 24b produces an oil pressure from its output. However, the turnover valve 26 is in its closed position 26a as in the case of level land travelling and, therefore, the main valve 5 of pilot operation type is its turnover position 5c. Thus, the construction equipment travels at a full power as in the case of level land travelling.

(3) On the operation in downward slope travelling

When the crawler 23 begins to come down a slope during the abovementioned rightward travel, as shown by the arrow 13a" in FIG. 7A, the pressure reducing valve 24a produces an oil pressure corresponding to the slanting angle α from its output. At the same time, the output pressure of the pump 6 lowers and the turnover valve 25 turns to its open position 25b, thereby producing a pilot pressure to be applied to the pilot chamber 5f of the main valve 5 of pilot operation type. The pilot chamber 5f acts against the pilot chamber 5e and the main valve 5 is turned from its turnover position 5c to its control position 5b. In the control position 5b, the flow between the exhaust port of the hydraulic motor 3 and the tank 7 is reduced in accordance with the spool position of the main valve 5 and, therefore, it is possible to prevent self-running of the construction equipment. Since the output of the slanting angle detector 24 increases with increase of the slanting angle, the main valve 5 returns from the control position 5b to the neutral position 5a to further reduce the flow between the hydraulic motor 3 and the tank 7 for preventing self-running of the construction equipment. While the description has been made about the case where the lever 13c of the remote control valve 13 is moved leftward, it should be understood that the same operation is effected when the lever 13c is moved rightward, except that the travelling direction of the construction equipment is inverted.

Figure 8:
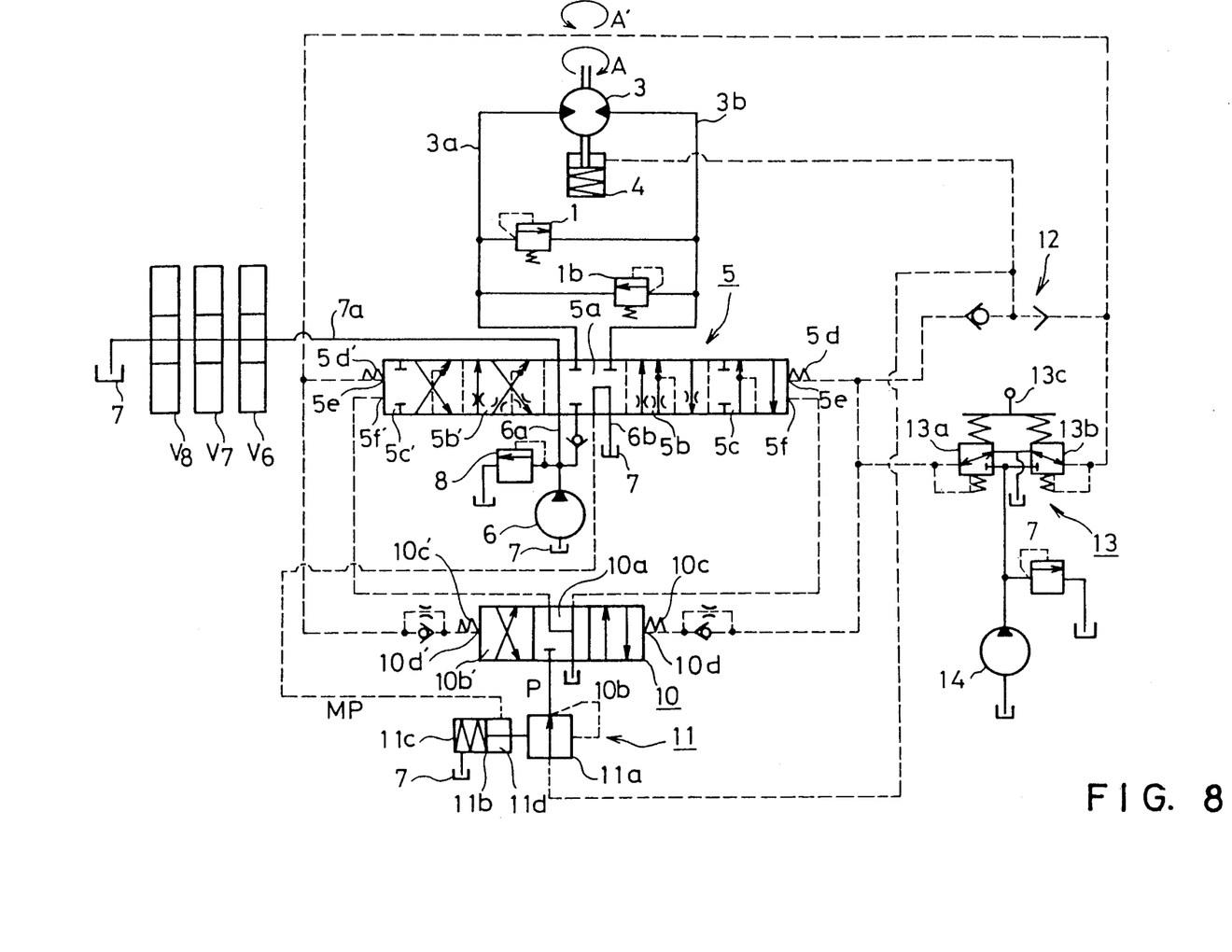
FIG. 8 is a schematic diagram of a second embodiment of the hydraulic motor control circuit according to this invention.
Figure 9:
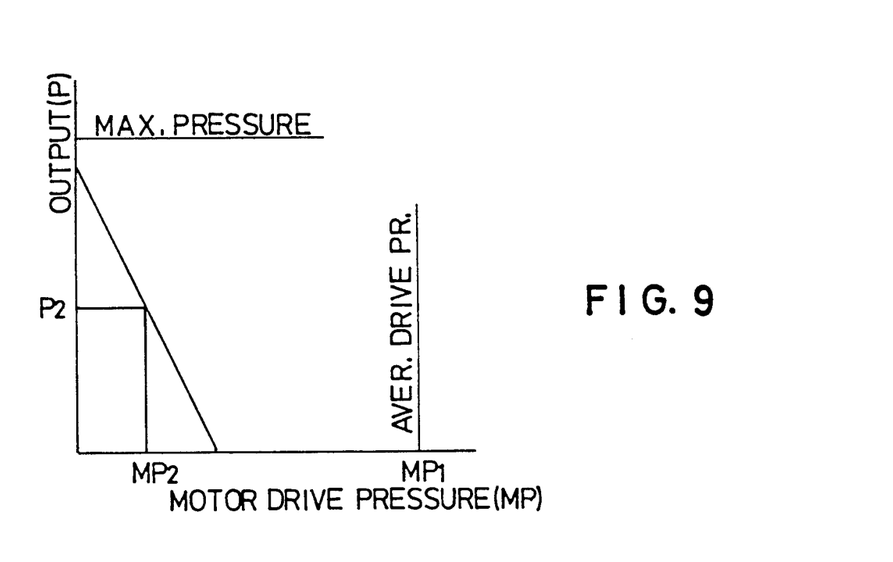
FIG. 9 is a characteristic diagram of a pressure reducing valve of pilot operation type used in the second embodiment.

FIG. 8 shows a second embodiment of this invention, in which the slanting angle detector 16 is removed from the first embodiment of FIG. 2 and, instead, the pressure chamber 11d of the pressure reducing valve 11 of pilot operation type is adapted to connect with the drive side of the hydraulic motor 3. When the oil pressure in the drive side of the hydraulic motor 3 is applied to the pressure chamber 11d, it overcomes the spring 11c to give a pressure reduction command to the pressure reducing valve 11. Thus, the pressure reducing valve 11 produces an oil pressure in accordance with the hydraulic motor driving pressure, as shown in FIG. 9. More specifically, the pressure reducing valve 11 produces no oil pressure from its output when there is no reduction in the oil pressure in the drive side of the hydraulic motor 3, while it produces an oil pressure P2 when the oil pressure in the drive side of the hydraulic motor 3 lowers from MP1 to MP2, for example, as shown in FIG. 9.

Now, the description will be made about the operation of the abovementioned hydraulic motor control circuit.

(1) On the operation in level land travelling

In FIG. 8, when the lever 13c of the remote control valve 13 is moved leftward, the pressure reducing valve 13a is actuated in response to the amount of movement of the lever 13c to produce a pilot pressure from its output. This pilot pressure is applied to the pilot chamber 5e of the main valve 5 of pilot operation type, the pilot chamber 10d of the turnover valve 10 of pilot operation type and also to the braking cylinder 4 for releasing brake of the hydraulic motor 3 through the shuttle valve 12.

The brake of the hydraulic motor 3 is released by the pilot pressure applied to the braking cylinder 4 and the main valve 5 is turned from its neutral position 5a to its turnover position 5c. Then, the compressed oil exhausted from the pump 6 flows through the main circuits 6a and 3a into the hydraulic motor 3 and discharged from the motor 3 through the main circuit 3b to the tank 7, thereby commencing rotation of the hydraulic motor 3 in the arrow direction A and movement of the construction equipment.

At this time, the turnover valve 10 of pilot operation type has been turned to its turnover position 10b to connect the output of the pressure reducing valve 11 of pilot operation type to the pilot chamber 5f of the main valve 5 of pilot operation type.

In the case of level land travelling, the hydraulic motor driving pressure is MP1 as shown in FIG. 9 and the pressure reducing valve 11 is arranged so that its pressure reducing valve 11a is never operated by the urging force of the spring 11c. Since the travelling speed of the construction equipment is very slow (4 to 6 kilometers per hour), the main valve 5 is always put in its turnover positions 5c or 5c' for full power operation in level land travel and never put in the control position 5b or 5b'. This is because the travelling speed is so low that it need not be controlled.

(2) On the operation in upward slope travelling

When the construction equipment begins to go up a slope during the abovementioned travel, the hydraulic motor driving pressure becomes higher than in the case of level land travelling. As described above, however, the pressure reducing valve 11 of pilot operation type is not actuated and, therefore, the main valve 5 of pilot operation type is in its turnover position 5c. Accordingly, the construction equipment travels at full power as in the abovementioned case of level land travelling.

(3) On the operation in downward slope travelling

When the construction equipment begins to come down a slope during the abovementioned travel, the hydraulic motor driving pressure begins to decrease quickly toward zero. As shown in FIG. 9, however, even if the hydraulic motor driving pressure decreased to MP2, this pressure MP2 is applied to the pressure chamber 11d of the pressure reducing valve 11 to produce a pilot pressure P2 from its output, which is to be applied to the pilot chamber 5f of the main valve 5 of pilot operation type. Since this pressure in the pilot chamber 5f acts against the pressure in the pilot chamber 5e, the main valve 5 is turned from its turnover position 5c to its control position 5b. Since, in the control position 5b, the flow between the exhaust port of the hydraulic motor 3 and the tank 7 is reduced in accordance with the spool position of the main valve 5 as shown in FIG. 3, it is possible to prevent self-running of the construction equipment. In the control position 5b of the main valve 5, the output pressure of the pressure reducing valve 11 as shown in FIG. 9 increases with increase of the slanting angle of the slope to further reduce the flow between the exhaust port of the hydraulic motor 3 and the tank 7, thereby preventing self-running of the construction equipment.

Though the above description has been made about the case where the lever 13c of the remote control valve 13 is moved leftward, it should be understood that the same operation is effected when the lever 13c is moved rightward, except that the travelling direction of the construction equipment is inverted.

We claim:

1. A hydraulic motor control circuit for a construction equipment driving device comprising a hydraulic driving motor, a pump for feeding pressurized oil to said hydraulic motor, and a tank for receiving the pressurized oil discharged from said hydraulic motor; said circuit comprising
    a main valve of pilot operation type including mutually opposing first and second pilot chambers, having a first position for driving said hydraulic motor and a second position for confining a speed of rotation of said hydraulic motor, and being inserted between said hydraulic motor and said pump,
    a remote control valve for feeding a pilot oil pressure to said first pilot chamber of said main valve,
    pilot pressure feeding means for feeding an output oil pressure corresponding to a downward slanting angle of a road surface being traveled by said equipment to the second pilot chamber of said main valve,
    means for turning said main valve from said first position to said second position when said pilot oil pressure and said output oil pressure are applied, respectively and generally simultaneously, to said first and second pilot chambers of said main valve, and
    means for making an aperture between said pump and said hydraulic motor less than an aperture between said hydraulic motor and said tank in said second position of said main valve.

2. A hydraulic motor control circuit for a construction equipment driving device comprising a hydraulic driving motor, a pump for feeding pressurized oil to said hydraulic motor, and a tank for receiving the pressurized oil discharged from said hydraulic motor; said circuit comprising

- a main valve of pilot operation type including mutually opposing first and second pilot chambers, having a first position for driving said hydraulic motor and a second position for confining a speed of rotation of said hydraulic motor, and being inserted between said hydraulic motor and said pump,
- a remote control valve for feeding a pilot oil pressure to said first pilot chamber of said main valve,
- pilot pressure feeding means driven by a driving pressure of said hydraulic motor for feeding an output oil pressure corresponding to a slanting angle of a road surface being traveled by said equipment to the second pilot chamber of said main valve,
- means for turning said main valve from said first position to said second position when said pilot oil pressure and said output oil pressure are applied, respectively and generally simultaneously, to said first and second pilot chambers of said main valve, and
- means for making an aperture between said pump and said hydraulic motor less than an aperture between said hydraulic motor and said tank in said second position of said main valve.

* * * * *